US010515544B2

(12) United States Patent
Jung et al.

(10) Patent No.: US 10,515,544 B2
(45) Date of Patent: Dec. 24, 2019

(54) DETERMINATION OF AT LEAST ONE FEATURE OF A VEHICLE

(71) Applicant: VITRONIC Dr.-Ing. Stein Bildverarbeitungssysteme GmbH, Wiesbaden (DE)

(72) Inventors: Andreas Jung, Ockenheim (DE); Marco Bartiromo, Wiesbaden (DE)

(73) Assignee: VITRONIC Dr.-Ing. Stein Bildverarbeitungssysteme GmbH, Wiesbaden (DE)

( * ) Notice: Subject to any disclaimer, the term of this patent is extended or adjusted under 35 U.S.C. 154(b) by 213 days.

(21) Appl. No.: 15/321,370

(22) PCT Filed: Jun. 23, 2015

(86) PCT No.: PCT/EP2015/064147

§ 371 (c)(1),
(2) Date: Dec. 22, 2016

(87) PCT Pub. No.: WO2015/197641

PCT Pub. Date: Dec. 30, 2015

(65) Prior Publication Data

US 2017/0148315 A1 May 25, 2017

(30) Foreign Application Priority Data

Jun. 23, 2014 (EP) .................................... 14173551

(51) Int. Cl.
*H04N 7/18* (2006.01)
*G08G 1/017* (2006.01)
*G08G 1/04* (2006.01)

(52) U.S. Cl.
CPC ............. *G08G 1/0175* (2013.01); *G08G 1/04* (2013.01)

(58) Field of Classification Search
CPC ............................... G08G 1/0175; G08G 1/04
(Continued)

(56) References Cited

U.S. PATENT DOCUMENTS 4,908,705 A 3/1990 Wight
6,766,038 B1 * 7/2004 Sakuma ................. G01P 3/806
340/933

(Continued)

FOREIGN PATENT DOCUMENTS

DE 10148289 A1 4/2003
EP 2703823 A1 3/2014

(Continued)

OTHER PUBLICATIONS

International Search Report dated Aug. 26, 2015, International Application No. PCT/EP2015/064147, filed Jun. 23, 2015.

(Continued)

*Primary Examiner* — Helen Shibru
(74) *Attorney, Agent, or Firm* — Dinsmore & Shohl LLP

(57) ABSTRACT

An arrangement for determining at least one feature of a vehicle moving along a traffic lane, having a light sensitive sensor for recording an image of the vehicle and having an evaluation device for determining the at least one feature on the image, as well as a method for determining at least one feature of a vehicle moving along a traffic lane, especially by means of such an arrangement, wherein an image of the vehicle is recorded with a line scan camera and the image is evaluated for determining at least one feature of the vehicle.

14 Claims, 2 Drawing Sheets

(58) Field of Classification Search
USPC .......................................................... 348/144
See application file for complete search history.

(56) References Cited

U.S. PATENT DOCUMENTS 7,308,113 B2 * 12/2007 Hagihara .................. G06T 7/60 348/154
7,869,621 B1 * 1/2011 Arpa .................. G06K 9/00785 382/104
2005/0008194 A1 1/2005 Sakuma et al.
2005/0113994 A1 * 5/2005 Bell ......................... G01C 7/04 701/472
2007/0236366 A1 * 10/2007 Gur .......................... G06K 9/00 340/945
2009/0290757 A1 * 11/2009 Mian .................. G06K 9/00214 382/104
2009/0323046 A1 * 12/2009 Tan ........................... E01H 1/00 356/4.01
2010/0238290 A1 * 9/2010 Riley ................... H04N 5/2251 348/148
2013/0047729 A1 * 2/2013 Wigh ................... G01N 29/043 73/636
2013/0050493 A1 2/2013 Mitic
2016/0148073 A1 * 5/2016 Uffenkamp ........... G06T 3/4038 348/148

FOREIGN PATENT DOCUMENTS

EP 2708902 A1 3/2014
WO 2012152596 A1 11/2012

OTHER PUBLICATIONS

Canadian Application No. 2,953,411, Canadian Office Action dated Sep. 13, 2018.

* cited by examiner

DETERMINATION OF AT LEAST ONE FEATURE OF A VEHICLE

CROSS REFERENCE TO RELATED APPLICATIONS

This application is a U.S. National Phase of PCT/EP2015/064147 filed Jun. 23, 2015, which claims priority of European Patent Application 14173551.4 filed Jun. 23, 2014, the contents of which are herewith incorporated by reference into the subject matter of the present patent application.

FIELD OF THE INVENTION

The invention relates to an arrangement for determining at least one feature of a vehicle moving along a traffic lane, having a light sensitive sensor for recording an image of the vehicle and having an evaluation device for determining the at least one feature on the image, as well as a method for determining at least one feature of a vehicle moving along a traffic lane by means of such an arrangement, wherein an image of the vehicle is recorded by means of a line scan camera and wherein the image is analysed for determining at least one feature of the vehicle.

BACKGROUND

Arrangements and methods for recording vehicles moving along a traffic lane by means of at least one camera and/or other devices for detecting the contour or spatial structure of the vehicle and, if necessary, of its velocity are for example known from different applications for monitoring or traffic detecting.

Automatic control systems for road toll, for example, which are based on the communication between vehicle and a corresponding communication device at the toll station, require, that in each road toll paying vehicle a corresponding communication device is present, from which the essential data of the vehicle can be recalled, which serve for its identification, wherein furthermore, also still the used road sections should be recorded and/or transmitted. The system has to be able to identify each vehicle, which has to pay toll, clearly as such a vehicle. I.e. that such vehicles should not be detected, which do not have to pay toll and on the other hand that all vehicles, which have to pay toll, are detected as such. To provide a method and a device for recording vehicles in movement, which can distinguish automatically between toll paying and non-toll paying vehicles, to thus prevent the unnecessary recording of large amounts of data, it is provided according to the Printed Document DE 101 48 289 A1, that before the recording of the contour and/or spatial structure, the recording and pursuit of the vehicle is carried out by means of a LIDAR-system, wherein from the LIDAR-data, the path and velocity of the vehicle are estimated and are then assigned to the determined contour- and structure data. The device has a LIDAR-system, which is aligned such, that it records a vehicle at a distance in front of the recording position of the camera and/or the other devices. Furthermore a central processing unit is provided, which is connected to the LIDAR and forecasts from the LIDAR-data the path and velocity of the vehicle, if necessary corrects these data and carries out on the basis of these data an assignment to the data of the other device and/or the recorded video image. A disadvantage is, that in the combination of a LIDAR-system and a video imaging device the respective results have to be securely and reproducibly assigned to each other, which is in comparison cumbersome.

In the evaluation of the video images furthermore the problem is given, that the evaluation is made difficult because of the perspective distortion and by the distortion itself and on the other hand by the reducing yield of the light with distance from the camera, which leads to a clearly weaker illumination of the areas of the vehicle arranged further away from the camera. This is essentially important in longer vehicles, like trucks.

SUMMARY OF INVENTION

An object of the present invention is to provide a simplified arrangement and a method for determining at least one feature of a vehicle moving along a traffic lane, which also enables a reliable or improved feature recognition, compared to the State of the Art, for example for the automatic differentiation between vehicles required to pay toll and vehicles not required to pay toll.

The object is met by the arrangement and the method according to the independent claims. In the respective dependent claims preferred embodiments and advantageous improvements are given.

The arrangement according to the invention for determining at least one feature of a vehicle moving along a traffic lane has a light sensitive sensor for recording an image of the vehicle and has an evaluation device for determining the at least one feature on the image. According to the invention it is provided, that the light sensitive sensor is realised as a line scan camera, wherein this line scan camera is preferably arranged laterally beside the traffic lane. Furthermore, it is provided, that exactly one line scan camera serves as a light sensitive sensor. Alternatively, several, especially two line scan cameras can be provided as light sensitive sensors.

Furthermore, according to the invention the number of lines per unit of time of the image is adapted to the velocity of the vehicle. The individual recordings of the line scan camera are designated as lines. According to a first preferred variant the number of lines per unit of time of the image is adapted to the velocity of the vehicle such, that a sampling rate of the line scan camera is adapted to the velocity of the vehicle. The sampling rate designates the frequency, with which the line scan camera records lines, i.e. the lines recorded for each unit of time. A second preferred variant to adapt the number of lines per unit of time of the image to the velocity of the vehicle, is, that a post-correction of the image is carried out in dependency of the velocity of the vehicle. By means of stretching or compressing the image, which is formed from the lines arranged one behind the other, the number of lines per unit of time can also be changed. Thus, advantageously a distortion of the image due to the velocity of the vehicle can be corrected, so that the image shows truly the width-to height ratio of the image is true to original. The velocity can be measured separately, or can be determined by means of the distorted image, which will be explained later. Basically, also a combination of both variants is possible, i.e. an adapted image sampling rate of the camera and a post-correction of the image, for example to minimise the error tolerance.

Of course, it is generally possible with a common surface camera, to record a vehicle moving in a traffic lane, in an image, e.g. with induction loops as trigger for the camera, however, such an image is perspectively distorted in both image dimensions. The use of a line scan camera has the advantage, that the distance from the recorded part of the vehicle to the line scan camera remains essentially constant, so that neither a perspective distortion in direction of the recordings attached one after the other nor a different light yield, because of the distance between vehicle and camera, are produced. Because of this reason, it is especially advantageous, to use a line scan camera for the arrangement laterally beside the traffic lane. The position laterally beside the traffic lane enables an especially effective recognition of many features of vehicles in the image, especially their length, number of axles, characteristic shape and lateral lettering, which can be helpful for the identification. Many of these features are for example not visible from a position above the traffic lane. The image is, in this case, constructed from one another following recordings of the line scan camera, wherein the line scan camera operates with a pre-determined, if necessary also an adaptable, sampling rate. A further advantage is, that the line scan camera can be used with the evaluation device for the image processing without further measuring devices. Beginning and end of a vehicle can be detected by means of analysing the constantly recorded line scans, so that advantageously no trigger of the recording has to take place, to produce a complete image of the vehicle. As the sampling rate of the line scan camera is known, also the velocity of the vehicle can be determined by means of a reference on the image, as with a constant sampling rate the image of a vehicle is shown depending on the velocity of the vehicle, compressed or stretched along the, horizontal axis of image, which corresponds to the axis of time, in relation to the true-to-original aspect ratio of the vehicle. Therefore, for example a known length of an object on the vehicle can serve as a reference. Especially advantageously, each wheel can serve as a reference. As the wheels of the vehicle, which are with sufficient accuracy circular, depending on the velocity of the vehicle, are shown elliptic because of the compression or stretching either in the height or in the width, the velocity of the vehicle can be determined from calculating the ellipticity. The ellipticity is also designated as eccentricity, which states the distance of the focal points of an ellipsis from its centre point.

Laterally beside the traffic lane, is to be understood in the sense of the invention such, that the line scan camera is not arranged vertically above the traffic lane, generally extending horizontally. However, the line scan camera can obviously also be arranged beside the traffic lane at a predetermined height above the level of the traffic lane.

A line scan camera in the sense of the invention is a camera type, which has only one light sensitive line, a so-called line sensor, in contrast to a two-dimensional sensor, which has a multitude of lines. Line sensors are light or radiation sensitive detectors, in general semiconductor detectors, which consist of a one-dimensional field of photo detectors or other detector elements.

According to a preferred embodiment it is provided, that the line scan camera is aligned inclined to the traffic lane. The alignment of the line scan camera is in the sense of the invention that direction, in which the light sensitive line is aligned, to receive light. The vehicle moves in a driving direction along the traffic lane. The lines scan camera arranged beside the traffic lane, can thus be aligned at a right angle to the vehicle and to the traffic lane and record its side face. If the angle is unequal 90° between the traffic lane and the line scan camera, the line scan camera is aligned in the sense of the invention inclined to the traffic lane. In the preferred case of a line scan camera, aligned aslant at an acute angle to the traffic lane, against the driving direction of the vehicle, initially the front of the vehicle and then its side face is recorded, which has the advantage that a detection of the vehicle registration and possible dangerous goods labels is enabled at the front of the vehicle. With an aslant alignment of the line scan camera at an obtuse angle to the traffic lane in driving direction of the vehicle, the line scan camera is also aligned inclined to the traffic lane in the sense of the invention. In this also preferred case, the side face of the vehicle is recorded first and then its rear side, which also enables a vehicle registration identification by means of the rear registration plate. It is especially preferably provided, that the line scan camera is aligned at an angle of approximately 30° to the traffic lane, against the driving direction of the vehicle. The angle of the line scan camera to a straight front of the vehicle is thus approximately 60°.

The alignment of the line scan camera means in the sense of the invention not the alignment of the line sensor itself, which generally is arranged vertically, i.e. essentially at a right angle to a plane formed by the traffic lane. A positioning at an angle distinctly lower than 90° to the vertical would generally also be possible for the line scan sensor.

According to a further embodiment of the arrangement a lighting device is provided, wherein the lighting device is aligned at an angular distance of at least 7° from the alignment of the line scan camera. The lighting device serves for illumination in weak light conditions, especially at night. An angular distance of at least 7° from the alignment of the line scan camera means, that the light, which is radiated from the lighting device, is reflected by the vehicle and is detected by the line scan camera, is deflected by at least 7° in the reflection. Thus, an over-excessive incidence of light, preventing evaluation of registration plates with retro-reflective surface can be advantageously prevented. For the lighting a visible light as well as an infra-red radiation is suitable.

According to a further preferred embodiment of the arrangement a control of the line scan camera is provided, wherein a sampling rate of the recorded lines is adjustable by the control. Furthermore, preferably a velocity measuring device is provided for measuring a velocity of the vehicle at the time of the recording of the image. Thus, an embodiment of the arrangement which is especially advantageous, can be realised, in which the sampling rate is adaptable by the control to the velocity of the vehicle, measured by a velocity measuring device. Thus, a compression or stretching of the image in the image horizontal or along the horizontal axis is at least as far as possible prevented, so that a post-correction, for example by means of the ellipticity of the shown wheels, can be omitted or has to be at least carried out less extensively. In an alternative embodiment the measuring of the velocity can be verified by a velocity measuring device with a constant sampling rate of the line scan camera by means of the velocity determinable arithmetically from the image. The velocity of the vehicle determined arithmetically from the image and/or measured, can be used additionally or alternatively to correct the image at a later stage, in that the image is compressed or stretched such, that the distortion because of the velocity of the vehicle is balanced out.

The method according to the invention for determining at least one feature of a vehicle moving along a traffic lane, especially by means of the above described arrangement, provides, that an image of the vehicle is recorded with the line scan camera and that the image is evaluated for determining at least one feature of the vehicle. An advantage of the method is, that an identification of vehicles is enabled with the help of the line scan camera only and an evaluation of the image. For this, especially the individually recorded lines or line scans are attached one after the other in a image horizontal or along the horizontal axis of the image, so that the horizontal axis corresponds to an axis of time. Linear marks produced along the horizontal axis show thus a time constant image, from which can be derived, that no vehicle is passing this image point of the line scan camera. Such horizontal linear marks, or especially an end of a horizontal linear mark can be used advantageously for an automated detection of a moving vehicle.

Furthermore according to the invention a number of lines for per unit of time of the image is adapted to a velocity of the vehicle. The number of lines per unit of time of the image is adapted according to a first preferred variant to the velocity of the vehicle such, that a sampling rate of the line scan camera is adapted to the velocity of the vehicle. A second preferred variant is, to adapt the number of lines per unit of time of the image to the velocity of the vehicle, to correct at a later stage the image in dependency of the velocity of the vehicle. Especially preferably, the velocity of the vehicle is measured at a time of the recording of the image and the image is corrected by means of stretching or compressing along the horizontal axis in dependency of the velocity. Furthermore preferred the velocity of the vehicle is arithmetically determined by means of the distortion of the image and the image is corrected by means of the arithmetically determined velocity by stretching or compressing the image along the horizontal axis.

According to a preferred embodiment, during the evaluation, an envelope is produced enclosing the image of the vehicle. From this, at least one of the dimensions height, length and width of the vehicle can be calculated under consideration of the sampling rate of the line scan camera and a velocity of the vehicle. The velocity of the vehicle can, in this case, be determined by means of a stretching or compressing the image along the horizontal axis in relation to the true to original aspect ratio on the vehicle or can be determined by means of a separate velocity measurement.

According to a further preferred embodiment it is provided, that a number and/or positions of the wheels and/or of the axels of the vehicle can be determined by means of finding round objects during the evaluation of the image. Furthermore, an ellipticity is determined from the round objects, detected during the analysis of the image. Especially preferably, a correction of the image is carried out by means of stretching or compressing the image along the horizontal axis under consideration of the determined ellipticity. According to a further preferred embodiment it is provided, that under consideration of the ellipticity and of the sampling rate of the line scan camera a velocity of the vehicle is calculated. This calculated velocity is a further feature of the vehicle, which can be determined advantageously by means of the line scan camera as the only measuring device. Alternatively, the calculated velocity can also be used for checking a velocity measured by a separate velocity measuring device.

BRIEF DESCRIPTION OF DRAWINGS

According to a further preferable embodiment it is provided, that a classification and/or identification of the vehicle is carried out by means of at least one of the following features received by means of analysing the image: dimensions, number of axles, vehicle registration, dangerous goods labels, shape of a front screen and/or of a side screen and characteristic shapes of the vehicle.

Followingly, the invention is described in more detail by means of an embodiment referring to the attached drawing. The explanations relate equally to the arrangement according to the invention and to the method. They are only exemplary and do not limit the general idea of the invention.

It shows

Figure 1:
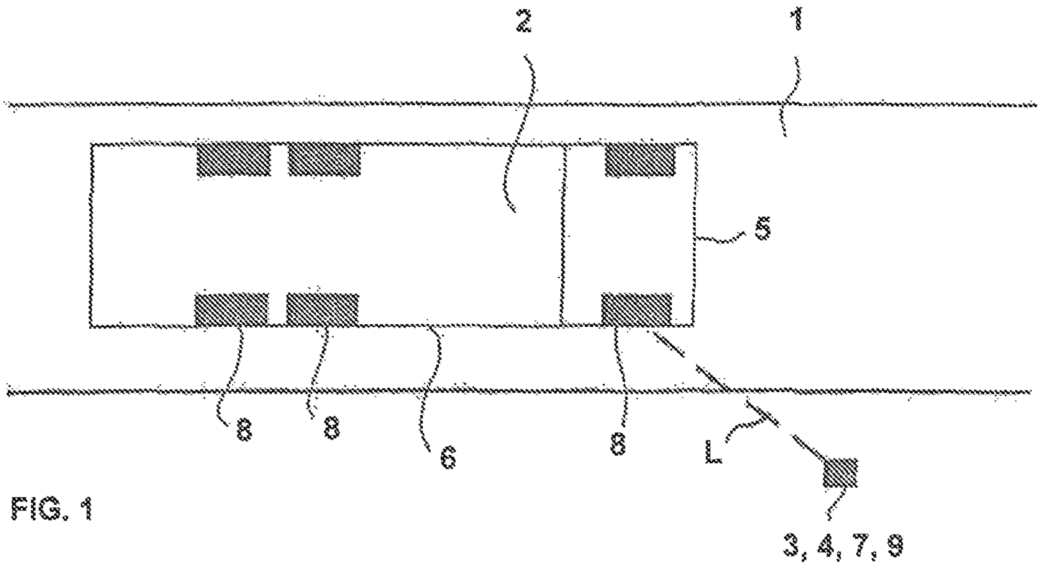
Figure 2:
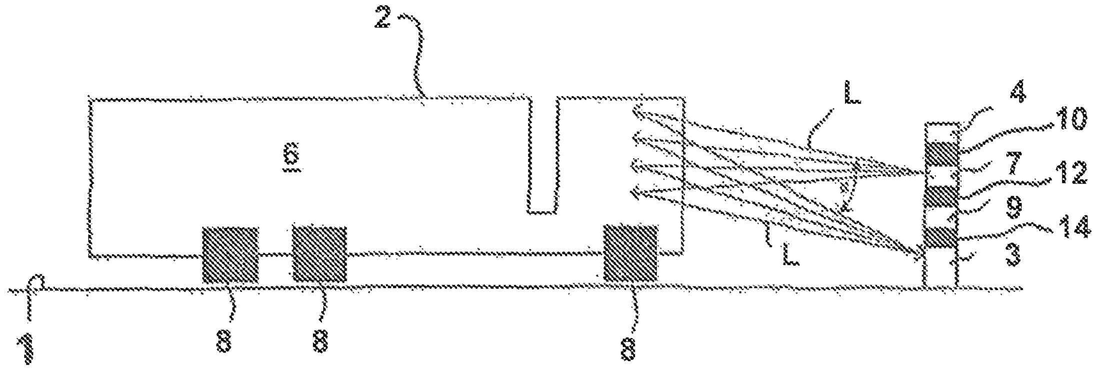
Figure 3:
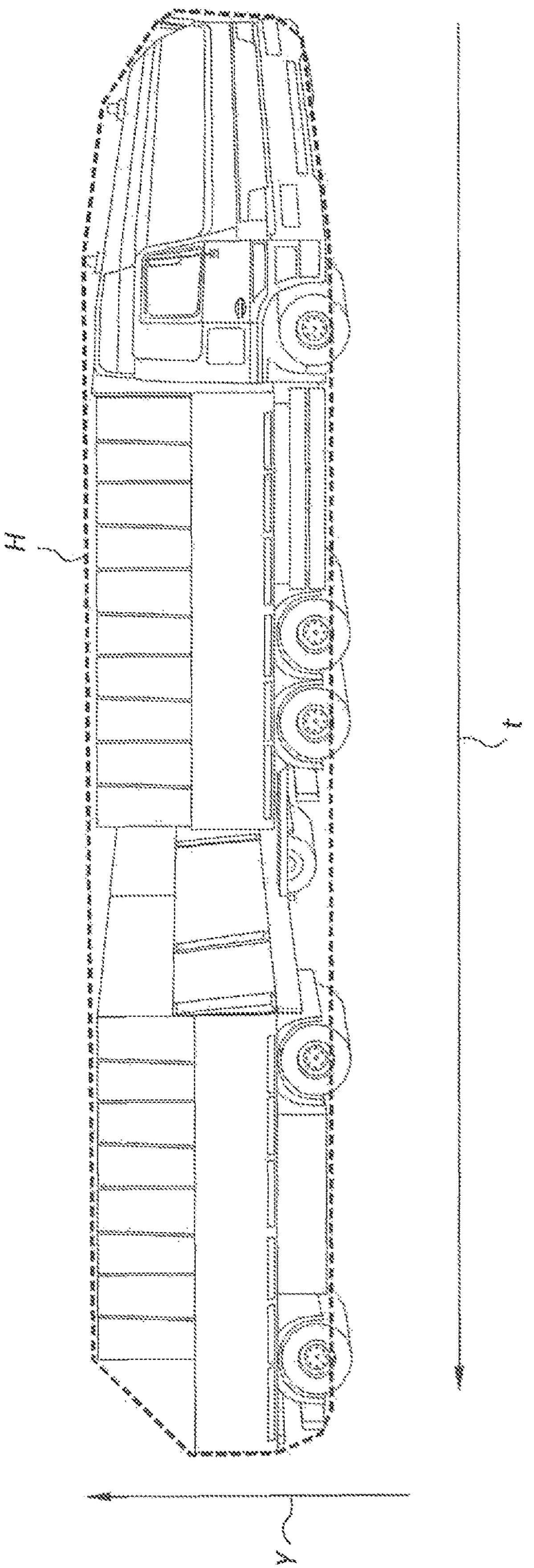

FIG. 1 a first schematic view of the arrangement according to the invention;

FIG. 2 a second schematic view of the arrangement of FIG. 1;

FIG. 3 an image of a vehicle produced according to the method according to the invention.

DETAILED DESCRIPTION OF THE PREFERRED EMBODIMENTS

In FIGS. 1 and 2 two different views of the arrangement according to the invention for determining at least one feature of a vehicle 2 moving along a traffic lane 1 are shown, which are described in the following together. In FIG. 1 a top view of the traffic lane 1 and of the vehicle 2 is shown, while in FIG. 2 a side view of the vehicle 2 is shown. The arrangement according to the invention comprises a light sensitive sensor 3 for recording an image of the vehicle 2 and an evaluation device 4 determining at least one feature on the image, wherein the evaluation device 4 can also be arranged distanced to the sensor 3. The light sensitive sensor 3 is realised according to the invention as a line scan camera 3, wherein the line scan camera 3 is arranged laterally besides the traffic lane 1.

The arrangement according to the invention is especially advantageous for a method for the classification of axles or is suitable for counting the number of axles of vehicles 2 in the flowing traffic. The method serves generally for the classification of vehicles 2, especially for determining striking features, like for example the vehicle manufacturer or dangerous goods labels while moving. Additionally an image of the vehicle registration, which is suitable for the automatic registration reading processing, is recorded with the same sensor 3. Furthermore, an image of the vehicle 2 is produced as an overview of the whole scene. By the arrangement according to the invention and by the method according to the invention four objects in the field of monitoring the traffic can be carried out solely by means of the one line scan camera 3 beside the traffic lane 1. The line scan camera 3 is arranged laterally such beside the traffic lane 1, that the front 5 of the vehicle and the side 6 of the driving passing vehicle 2 are recorded cyclically. In the case, that the natural surrounding light, especially at night, is not sufficient, a lighting device 7 is preferably directed onto the vehicle 2. The angle between the line scan camera 3 and the vehicle 2 is in this case generally freely selectable and can be adapted in dependency of the application. Generally an angle as close as possible to 90° to the to be monitored area is advantageous. As in the shown embodiment the front 5 of the vehicle as well as the side 6 of the vehicle should be recorded, an angle of approximately 60° onto the front 5 is recommendable, as this contains more detailed information than the side 6, from which the light is reflected accordingly under a more acute angle of 30° into the line scan camera 3. From FIG. 2 it is visible, that light, starting from the lighting device 7 and schematically represented by the arrow designated L, and reflected by the vehicle 2, falls into the line scan camera 2 preferably under an angle a of more than 7°. At an angular distance of more than 7° between the lighting device 7 and the camera 3, an over exposure because of the so-named retro-reflective effect by registration plates is advantageously prevented.

With the method according to the invention an image of the vehicle 2 is produced and thus enables a simple image processing of the same, as no partial images have to be put together or overlaid. Advantageously, no distortions on the side 6 of the vehicle 2 are produced along the horizontal axis of the image, as the distance between the camera 3 and the vehicle 2 remains essentially constant, except of deviations because of steering movements of the vehicle 2 or unevenness of the side 6 of the vehicle 2. Furthermore, no falling lines are produced in the image onto the side 6 of the vehicle 2. The method according to the invention is suitable furthermore for determining a velocity of the vehicle 2. Depending on how elliptical the wheels 8, only shown schematically here, are represented on the image, the velocity of the vehicle 2 can be derived therefrom.

All the features stated here can be recognised by the arrangement according to the invention with only one sensor 3. In FIGS. 1 and 2, the sensor 3 can be placed slightly above the road surface. The mounting of the sensor 3 on a bridge (not shown) is also possible, however in any case laterally off-set to the to be monitored area, i.e. the traffic lane 1.

A velocity sensor 9, based on a laser, like for example a LIDAR-sensor, as it is used in velocity measuring devices, can preferably be provided as an additional detector for vehicles 2. The velocity sensor 9 and the line scan camera 3 are arranged at the same position laterally beside the road as defined by the traffic lane 1. At the point of time of detention the velocity sensor 9 delivers preferably the following data of the vehicle: position relative to the sensor, distance and velocity of the vehicle 2. Also indicated in FIG. 2 is each of a first spacer 10 separating the evaluation device 4 from the lighting device 7, a second spacer 12 separating the lighting device 7 from the velocity measuring device 9, and a third spacer 14 separating the velocity measuring device 9 from the line scan camera 3.

In FIG. 3 an image of a vehicle 2 produced by the method according to the invention is shown. In contrast to general cameras, so-called Still Cameras or Area Scan Cameras, which show both coordinate axes in the image spatial position distorted by the perspective, the image along the horizontal axis is, when using a line scan camera 3 with the arrangement according to the invention, substituted by a time sequence of the line recordings produced one after the other along the time axis designated with t and is thus free of perspective distortions. The distance from one pixel to the next pixel in direction of the t-axis corresponds to the sampling rate or lines frequency of the line scan camera 3 and is preferably adapted to the velocity of the vehicle 2, determined by the velocity sensor 9, so that no squashed or stretched images are produced in direction of the t-axis. The image vertical in direction of the axis designated with Y corresponds to the alignment of the line scan sensor 3.

The line scan camera 3 is arranged at a fixed position and is not moved. Fixed objects are represented according thereto by horizontal lines with only low dynamic, possible because of pixel noise or shadows. FIG. 3 shows the image of a truck 2 in movement. The outline or envelope H of the vehicle 2 can be determined advantageously by simple edge filters. Even shadows running through the image can be easily identified and do not lead to false assessments, as this is regularly the case in recording with Still Cameras, as no time reference can be produced. The geometric information, like length and/or height can be advantageously determined by means of this edge image. If the positions of the axles of the vehicle are already known, it can be advantageously excluded, that the front of the vehicle 2 is measured additionally. The measurement of the vehicle length starts for example with the first determined axle. Depending on the identified vehicle type, like truck or passenger vehicle, the length can be corrected by an averaged factor.

Other sensors, which are used for monitoring traffic, like LIDAR Scanners, operate normally with a sampling rate of 100 to 200 Hz and deliver thus no detailed data, like for example a wheel is only shown with approximately three pixels, which does not allow an extensive evaluation, compared to the image produced by a line scan camera. Line scan cameras, like they are used according to this invention, can operate with a line frequency of up to 80 kHz and offer, thus, advantageously advanced possibilities for using the data. This invention makes it possible to produce all data, which are necessary for the collection of toll charges, with the line scan camera 3 as the sole sensor and with only one data recording cycle. In detail these are: recording of an image of the vehicle registration plate, recording of an overall image, classification of the vehicle based on its axles and of the vehicle geometry. Furthermore it is possible, to determine dangerous goods labels and the vehicle manufacturer. As all data can be produced in one step, consistent sets of data, which are integer, are produced. A mis-assignment of data from several sensors can be advantageously prevented such.

LIST OF REFERENCE SIGNS

1 traffic lane
2 vehicle
3 line scan camera
4 evaluation device
5 front of the vehicle
6 side of the vehicle
7 lighting device
8 wheels
9 velocity measuring device
L arrows
α angle
t axis of time, image horizontal, horizontal axis of the image
Y axis, image vertical
H envelope

The invention claimed is:

1. An assembly arrangement for determining at least one feature for identifying a vehicle moving along a traffic lane, comprising;

a light sensitive sensor for recording an image of the vehicle, an evaluation device for determining the at least one feature on the image, wherein the light sensitive sensor comprises one single line scan camera only, which adapts a number of lines per unit of time of the image to a velocity of the vehicle, and wherein the singly line scan camera is arranged laterally beside the traffic lane, and either aligned aslant at an acute angle to the traffic lane against a driving direction of the vehicle, or aslant at an obtuse angle to the traffic lane in driving direction of the vehicle, and the assembly further including a controller for the single line scan camera, wherein a sampling rate of the recorded lines is adjustable by the controller, wherein the number of lines per unit of time of the image is adapted to the velocity of the vehicle such that the sampling rate of the single line scan camera is adapted to the velocity of the vehicle.

2. The assembly of claim 1, wherein a post-correction of the image is executed in dependency of the velocity of the vehicle.

3. The assembly of claim 1, wherein the line scan camera is aligned at an angle of approximately 30° to the traffic lane against the driving direction of the vehicle.

4. The assembly of claim 1, comprising;

a lighting device, wherein the lighting device is aligned at an angular distance of at least 7° from the alignment of the line scan camera.

5. The assembly of claim 1, comprising;

a velocity measuring device for measuring the velocity of the vehicle at the time of the recording of the image.

6. The assembly of claim 1, wherein the sampling rate is adapted by means of the controller to the measured velocity of the vehicle.

7. A method for determining at least one feature for identification of a vehicle moving along a traffic lane, including the steps of: recording an image of the vehicle with at least one line scan camera and analyzing the image to determine the at least one feature of the vehicle, wherein a number of lines per unit of time of the image is adapted to a velocity of the vehicle, determining round objects detected during the analysis of the image;

wherein the number of lines per unit of time of the image is adapted to the velocity of the vehicle such, that a sampling rate of the line scan camera is adapted to the velocity of the vehicle while the image is recorded; and wherein the sampling rate of the line scan camera is adapted such that a distortion of the image due to the velocity of the vehicle is corrected.

8. The method of claim 7, wherein the number of lines per unit of time of the image is adapted to the velocity of the vehicle such, that the image is post-corrected in dependency of the velocity of the vehicle.

9. The method of claim 7, wherein the recorded lines are attached one after the other along a horizontal image, wherein linear marks appearing along the horizontal of the image, are used for detecting the vehicle.

10. The method of claim 9, wherein further comprising the step of enclosing the image of the vehicle in an envelope.

11. The method of claim 10, comprising the step of and calculating at least one of the dimensions height, length and width of the vehicle from the envelope using of a sampling rate of the line scan camera and of the velocity of the vehicle from the envelope.

12. The method of claim 7, comprising the step of;

determining a number and/or position of wheels and/or axles of the vehicle by detecting the round objects during the analysis of the image.

13. The method of claim 7, further comprising the step of;

correcting the image by means of stretching or compressing along a horizontal axis of the image.

14. The method of claim 7 further including the step of;

classifying the vehicle by analyzing the image by means of at least one of the following features, dimensions, number of axles, vehicle registration, dangerous goods label, shape of a front screen and/or of a side screen and characteristic shapes of the vehicle.

* * * * *